(12) United States Patent
Takamura et al.

(10) Patent No.: US 10,337,473 B2
(45) Date of Patent: Jul. 2, 2019

(54) AIR INTAKE DEVICE FOR ENGINES

(71) Applicant: MAZDA MOTOR CORPORATION, Hiroshima (JP)

(72) Inventors: Yuta Takamura, Hiroshima (JP); Kenji Sugasaki, Hiroshima (JP); Motohiro Ariki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/759,290

(22) PCT Filed: Feb. 10, 2017

(86) PCT No.: PCT/JP2017/004911
§ 371 (c)(1),
(2) Date: Mar. 12, 2018

(87) PCT Pub. No.: WO2017/150144
PCT Pub. Date: Sep. 8, 2017

(65) Prior Publication Data
US 2018/0258890 A1    Sep. 13, 2018

(30) Foreign Application Priority Data

Mar. 3, 2016    (JP) ................................ 2016-040696

(51) Int. Cl.
*F02M 35/04* (2006.01)
*B01D 46/00* (2006.01)
(Continued)

(52) U.S. Cl.
CPC ....... *F02M 35/044* (2013.01); *B01D 46/0005* (2013.01); *B01D 46/0043* (2013.01);
(Continued)

(58) Field of Classification Search
CPC ........... F02M 35/044; F02M 35/10386; F02M 35/0245; F02M 35/024; B01D 46/0049;
(Continued)

(56) References Cited

U.S. PATENT DOCUMENTS 4,713,097 A    12/1987    Grawi et al.
4,790,864 A    12/1988    Kostun
(Continued)

FOREIGN PATENT DOCUMENTS

DE    102009016739 A1 *    10/2010    ......... B01D 46/0015
JP    S63215867 A    9/1988
(Continued)

OTHER PUBLICATIONS

International Search Report issued in PCT/JP2017/004911; dated Apr. 11, 2017.

*Primary Examiner* — Hung Q Nguyen
(74) *Attorney, Agent, or Firm* — Studebaker & Brackett PC

(57) ABSTRACT

An intake device of an engine includes an air cleaner and an air flow sensor. The air cleaner includes an air filter, a cleaner case which forms a primary side space above the air filter and a secondary side space below the air filter, an inlet duct, and an outlet duct. The air flow sensor is fixed to the outlet duct. The cleaner case has a first side wall on which the inlet duct is mounted, and a second side wall which opposedly faces the first side wall. The air filter has a folded shape like bellows, and is held in the cleaner case. The second side wall has a deflecting portion which deflects air introduced from the inlet duct into a flow directed in an obliquely upward direction.

5 Claims, 7 Drawing Sheets

(51) Int. Cl.
*B01D 46/44* (2006.01)
*B01D 46/52* (2006.01)
*F02M 35/024* (2006.01)
*F02M 35/10* (2006.01)
*B01D 46/10* (2006.01)
*F02M 35/14* (2006.01)

(52) U.S. Cl.
CPC ......... *B01D 46/0049* (2013.01); *B01D 46/10* (2013.01); *B01D 46/444* (2013.01); *B01D 46/521* (2013.01); *F02M 35/0245* (2013.01); *F02M 35/10386* (2013.01); *F02M 35/14* (2013.01); *B01D 2279/60* (2013.01)

(58) Field of Classification Search
CPC ................ B01D 46/10; B01D 46/0043; B01D 46/0005; B01D 46/444; B01D 46/521; B01D 2279/60
See application file for complete search history.

(56) References Cited

U.S. PATENT DOCUMENTS

| | | | | |
|---|---|---|---|---|
| 4,930,472 A * | 6/1990 | Ozaki | ..................... | F02M 35/14 123/198 E |
| 5,171,342 A * | 12/1992 | Trefz | ................. | B01D 46/2411 55/487 |
| 5,640,937 A * | 6/1997 | Slopsema | .......... | B01D 46/0002 123/198 E |
| 6,143,049 A * | 11/2000 | Gieseke | ............. | B01D 46/0023 55/323 |
| 6,835,237 B2 * | 12/2004 | Ishida | ................ | B01D 46/0023 123/518 |
| 7,191,739 B1 * | 3/2007 | Klop | ...................... | F01P 11/029 123/198 E |
| 7,608,137 B2 * | 10/2009 | Oda | ...................... | F02M 35/024 55/309 |
| 7,670,411 B2 * | 3/2010 | Suzuki | ............... | B01D 53/0407 123/518 |
| 8,137,424 B2 * | 3/2012 | Ohzono | ............. | F02M 35/024 123/198 E |
| 2002/0124733 A1 * | 9/2002 | Iriyama | ............. | B01D 53/0415 96/134 |
| 2007/0012274 A1 * | 1/2007 | Kawatani | ......... | F02M 35/10013 123/184.21 |
| 2010/0071650 A1 * | 3/2010 | Sato | .................... | F02M 35/0203 123/184.21 |
| 2011/0232983 A1 * | 9/2011 | Abe | .................... | B01D 46/0005 180/68.3 |
| 2012/0192535 A1 * | 8/2012 | Schrewe | ............ | B01D 46/0005 55/385.3 |
| 2018/0258890 A1 * | 9/2018 | Takamura | .......... | B01D 46/0005 |

FOREIGN PATENT DOCUMENTS

| | | |
|---|---|---|
| JP | H01111173 U | 7/1989 |
| JP | 2004-211661 A | 7/2004 |
| JP | 2005-061382 A | 3/2005 |
| JP | 2010-180773 A | 8/2010 |
| JP | 2014-156854 A | 8/2014 |

* cited by examiner

AIR INTAKE DEVICE FOR ENGINES

TECHNICAL FIELD

The present invention relates to an intake device of an engine equipped with an air cleaner.

BACKGROUND ART

In a middle portion of an intake passage of an engine, an air cleaner for removing a foreign substance such as a dirt or a dust contained in air (intake air) is mounted. For example, Patent Literature 1 discloses an air cleaner which includes: a cleaner case having an inlet duct and an outlet duct; and an air filter retained in the inside of the cleaner case. Air is introduced into a primary side space of the cleaner case from the inlet duct, and the air is moved to a secondary side space through the air filter to be discharged from the outlet duct.

An air flow sensor is arranged at a position downstream side of the air filter (secondary side passage) in the intake passage. An air flow rate is detected by the air flow sensor. Although various kinds of air flow sensors are known as the air flow sensor to be used in such a purpose, recently, a hot wire type air flow sensor has been relatively frequently used from a viewpoint that such an air flow sensor has small air flow resistance. The hot wire type air flow sensor includes a heat line (hot wire) made of platinum, and outputs a voltage which corresponds to a temperature of the hot wire which changes along with a change of a flow speed of air.

As described above, the hot wire type air flow sensor outputs a voltage which corresponds to a change in temperature of the hot wire. Accordingly, to enable the air flow sensor to stably detect an air (intake air) flow rate with high accuracy, it is important to make the flow of air directed to the hot wire stable. In view of the above, including the above-mentioned Patent Literature 1, a conventional air cleaner of this type includes a flow straightening slit, a flow straightening plate or the like in a cleaner case for making the flow of air stable.

However, when the air cleaner includes the flow straightening slit, the flow straightening slit becomes air flow resistance and hence, an output/torque of an engine is lowered. Further, in the case where the flow straightening plate is formed on the cleaner case by molding, there is a concern that a drawback such as worsening of external appearance due to a molding defect (generation of fillets) or lowering of a yield is brought about.

CITATION LIST

Patent Literature

Patent Literature 1: JP H1-111173 U

SUMMARY OF INVENTION

The present invention has been made in view of the above-mentioned circumstances, and it is an object of the present invention to provide an intake device of an engine where detection accuracy by an air flow sensor can be stably maintained without causing a drawback such as lowering of an output/torque of the engine or lowering of a yield at the time of manufacturing the intake device.

According to the present invention, there is provided an intake device of an engine including: an air cleaner that includes an air filter disposed approximately horizontally, a cleaner case forming a primary side space below the air filter and forming a secondary side space above the air filter, and an inlet duct for introducing air into the primary side space from a side and an outlet duct for discharging air to a side from the secondary side space, the inlet duct and the outlet duct being provided on the cleaner case; and an air flow sensor fixed to the outlet duct or an outlet hose connected to the outlet duct, wherein the cleaner case includes a first side wall on which the inlet duct is provided and a second side wall which opposedly faces the first side wall, the air filter has a folded shape like bellows, and is held in the cleaner case such that folding edges of the air filter extend in a direction orthogonal to an arranging direction of the first side wall and the second side wall, and the second side wall has a deflecting portion which deflects air introduced from the inlet duct into a flow directed in an obliquely upward direction.

DESCRIPTION OF EMBODIMENTS

Hereinafter, a preferred embodiment of the present invention is described in detail with reference to the attached drawings.

(Configuration of Intake Device 1)

Figure 1:
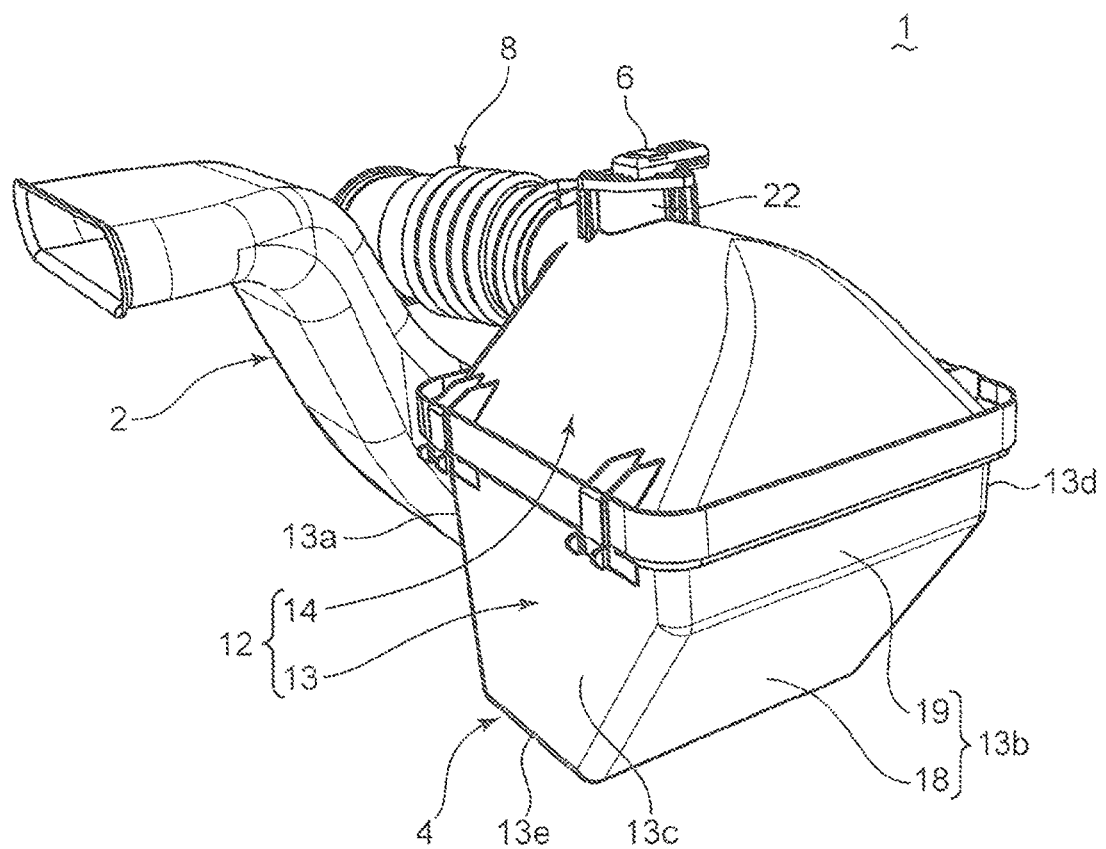
FIG. 1 is a perspective view of an intake device according to an embodiment of the present invention.
Figure 2:
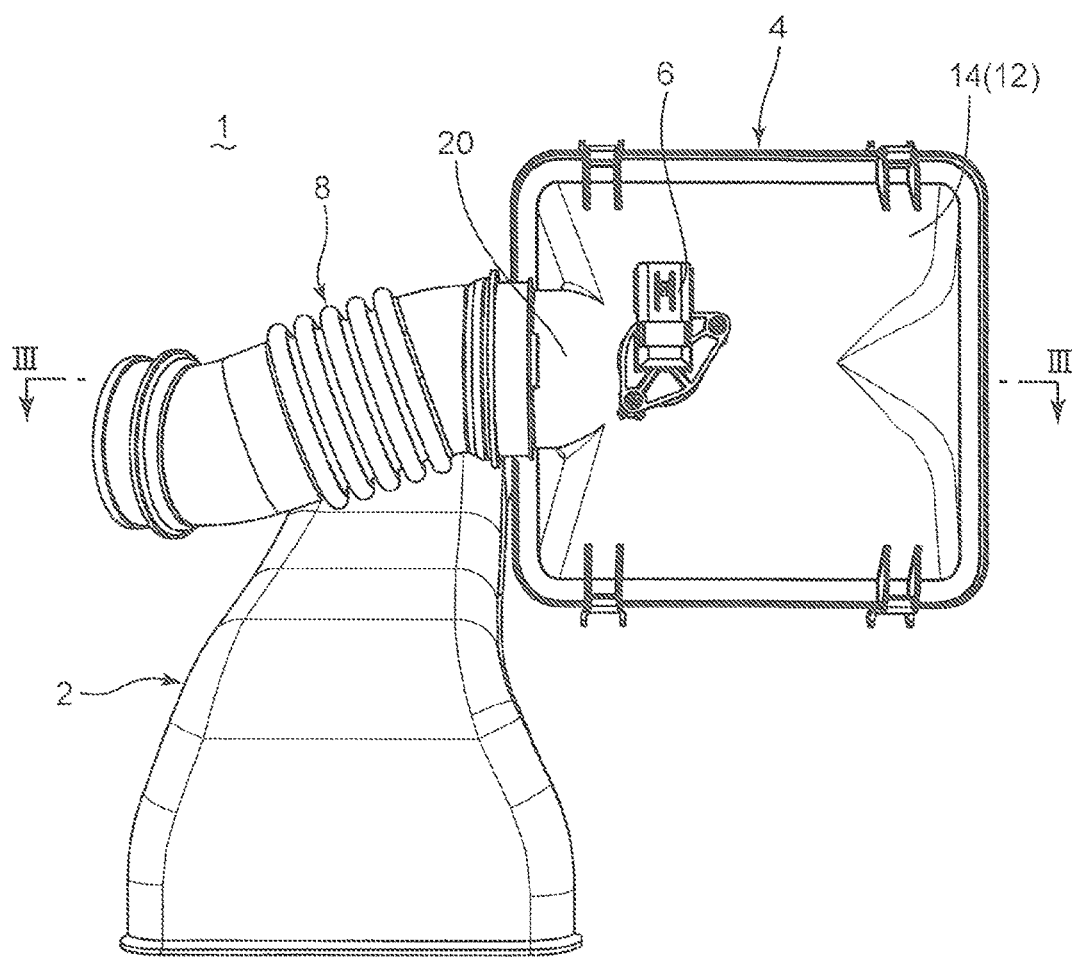
FIG. 2 is a plan view of the intake device.
Figure 3:
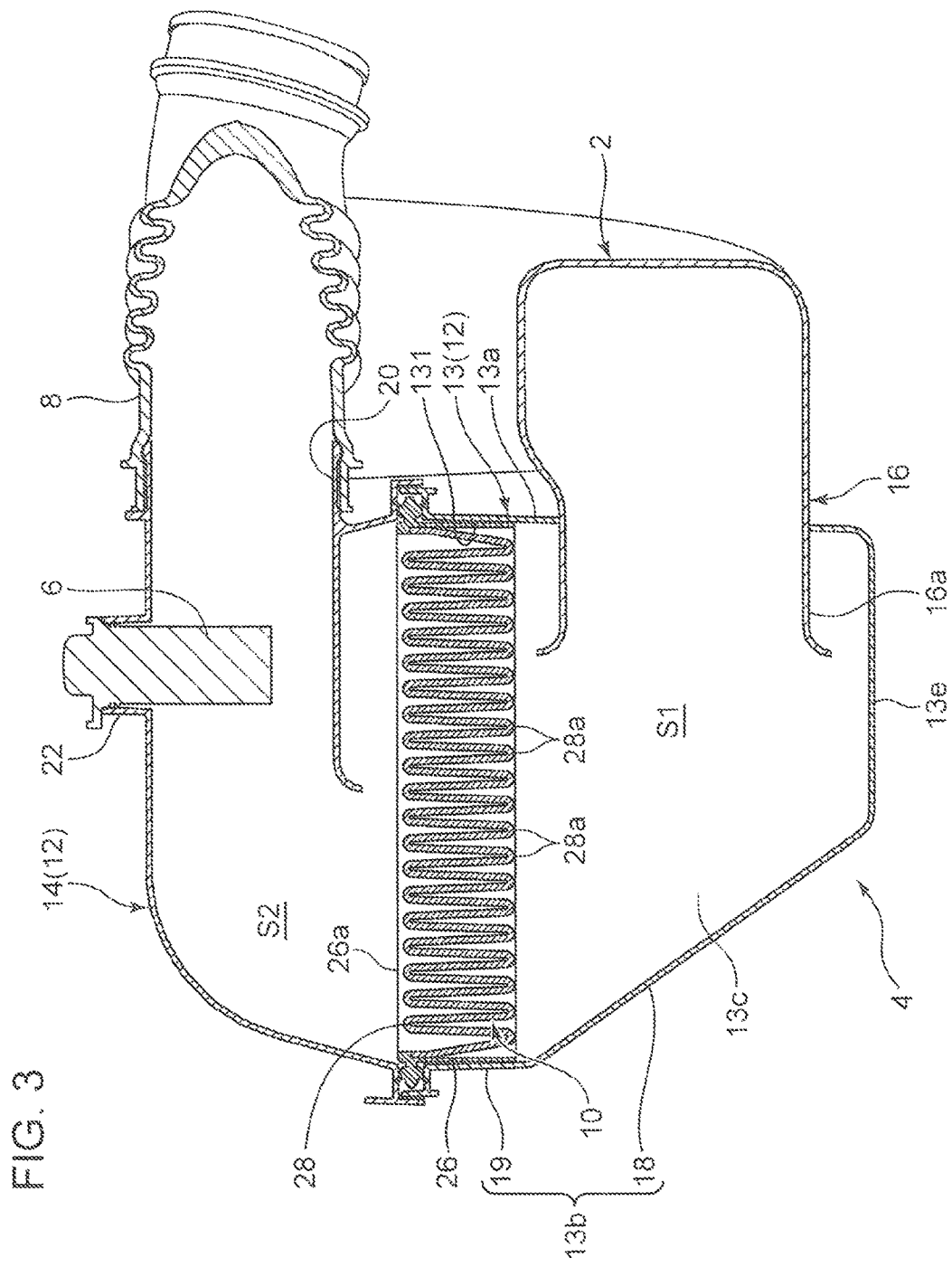
FIG. 3 is a cross-sectional view of the intake device (a cross-sectional view taken along a line III-III in FIG. 2).

FIG. 1 to FIG. 3 show an intake device of an engine according to the embodiment of the present invention. FIG. 1 is a perspective view, FIG. 2 is a plan view, and FIG. 3 is a cross-sectional view of the intake device, respectively.

As shown in FIG. 1 to FIG. 3, the intake device 1 includes: a cool air duct 2 having an air take-in portion (take-in port) for taking in air from the outside on an upstream end thereof an air cleaner 4 for removing a foreign substance such as a dirt or a dust contained in air (intake air): an air flow sensor 6 which is assembled in the air cleaner 4; an outlet hose 8 for guiding air from which foreign substances are removed; an intake manifold not shown in the drawing for supplying air to respective cylinders in a distributing manner; and a throttle valve not shown in the drawing which is interposed between the outlet hose 8 and the intake manifold for adjusting an amount of intake air. That is, the intake device 1 removes foreign substances in air using the air cleaner 4 while taking in air from the cool air duct 2 and supplies air after removing foreign substances to respective cylinders of the engine corresponding to the degree of opening of the above-mentioned throttle valve.

The air cleaner 4 includes a cleaner case 12, and an air filter element 10 accommodated in the cleaner case 12.

The cleaner case 12 is constituted of a lower first housing 13 which forms a primary side space S1, and an upper second housing 14 which is assembled to an upper portion of the first housing 13 in a detachable manner and forms a secondary side space S2. The primary side space S1 is a space upstream side of an air filter element 10 described later, that is, a space into which air is introduced before foreign substances such as dusts are removed from the air. The secondary side space S2 is a space downstream side of the air filter element 10, that is, a space into which air from which the foreign substances are removed is discharged.

The first housing 13 is a box-shaped housing having a rectangular shape as viewed in a plan view and having an opening portion 131 which opens upward. The whole first housing 13 is made of a resin material. In more detail, the first housing 13 includes: a first side wall 13a having an inlet duct 16; a second side wall 13b which oppositely faces the first side wall 13a; third and fourth side walls 13c, 13d which respectively connect both ends of the side walls 13a, 13b to each other and extend parallel to each other; and a bottom wall 13e. The primary side space S1 is formed by these side walls 13a to 13d and the bottom wall 13e.

In this embodiment, the inlet duct 16 also serves as one end portion of the cool air duct 2. That is, one end portion of the cool air duct 2 is inserted into an opening portion formed in the first side wall 13a, and the cool air duct 2 is mounted on the first side wall 13a by pawl fitting or the like, so that the inlet duct 16 is formed by one end portion of the cool air duct 2. It is needless to say that the inlet duct 16 may be integrally formed with the first side wall 13a, and the cool air duct 2 which is formed as a body separate from the inlet duct 16 may be connected to the inlet duct 16.

The inlet duct 16 is formed to extend to the inside of the first housing 13 approximately horizontally with respect to the second side wall 13b such that air which the cool air duct 2 takes in is introduced approximately horizontally toward the second side wall 13b. That is, the inlet duct 16 has an extension portion 16a projecting into the inside of the first housing 13 and extending approximately horizontally toward the second side wall 13b.

On the second side wall 13b which oppositely faces the first side wall 13a, a deflecting portion 18 which deflects the flow of air introduced into the primary side space S1 is formed. The deflecting portion 18 is an inclined surface which is formed on the second side wall 13b at a position oppositely facing an opening portion of the inlet duct 16. Specifically, as shown in FIG. 3, the inclined surface is inclined upwardly as the inclined surface is separated from the first side wall 13a (as extending from a right side toward a left side). With such a configuration, air which is introduced into the primary side space S1 from the inlet duct 16 along the horizontal direction is deflected into a flow directed in an upward direction along the deflecting portion 18 (inclined surface). Further, the second side wall 13b has a vertical wall portion 19 continuously formed on an upper side of the deflecting portion 18 and extending approximately vertically.

Figure 4:
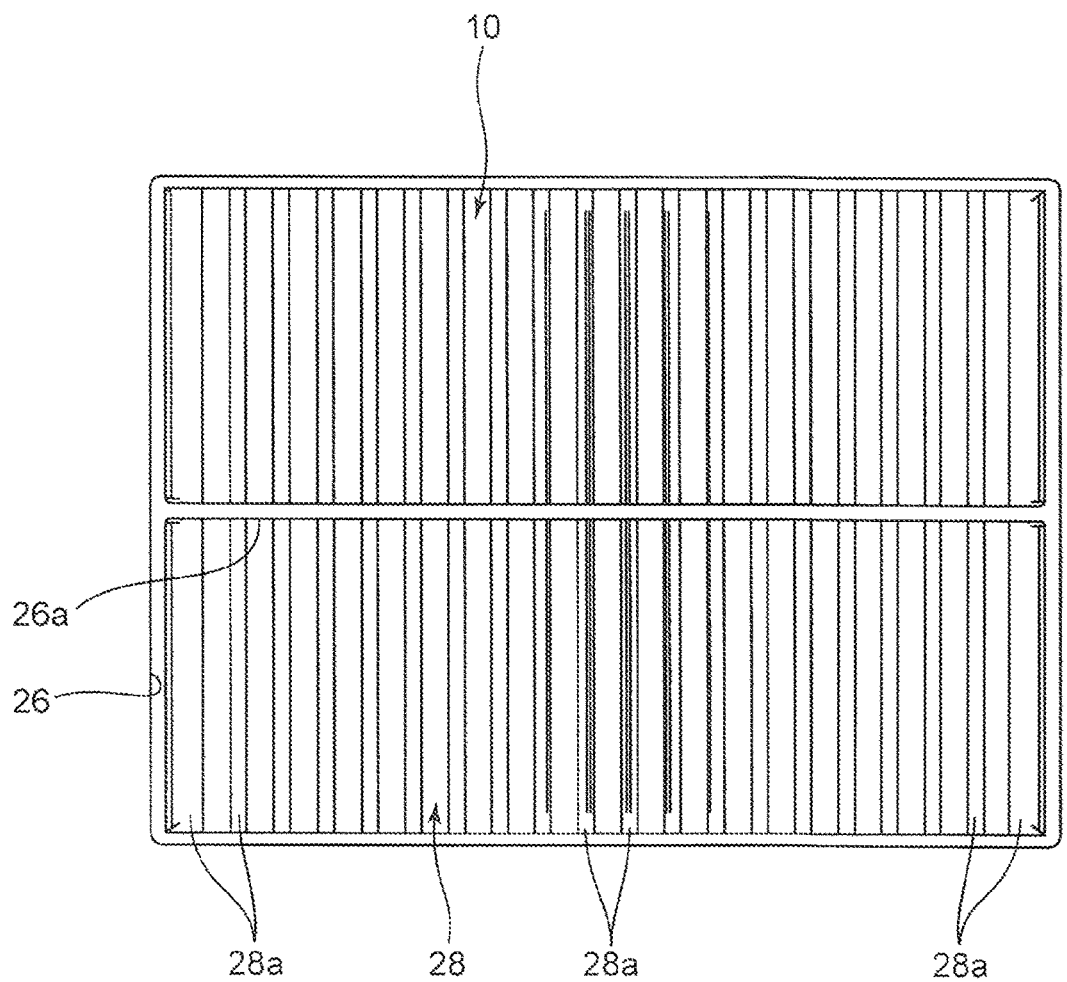
FIG. 4 is a bottom plan view of an air filter element.

The air filter element 10 is detachably fitted in the opening portion 131 of the first housing 13. As shown in FIG. 3, the air filter element 10 has a vertically-flat rectangular parallelepiped shape, and as shown in FIG. 4, the air filter element 10 includes a filter body 28 (corresponding to an air filter of the present invention) and a resin-made or rubber-made frame 26 for holding the filter body 28.

The filter body 28 is formed by folding a rectangular sheet formed by irregularly entangling fibers, for example, a filter paper, a non-woven fabric or the like into bellows (waveform). The filter body 28 is fitted inside the above-mentioned frame 26, and is held by the frame 26. At the center of the filter body 28, a slit extending in a direction orthogonal to a direction of folding edges 28a is formed. The filter body 28 is held by the frame 26 in a state where a plate-like reinforcing rib 26a formed on the frame 26 is inserted into the slit. With such a configuration, the filter body 28 is disposed between the primary side space S1 and the secondary aide space S2 described later without causing slackening at the center of the filter body 28.

The air filter element 10 is fitted in the opening portion 131 of the first housing 13 such that the folding edges 28a of the filter body 28 extend in a direction orthogonal to an arranging direction of the first side wall 13a and the second side wall 13b, that is, in a direction orthogonal to an air introducing direction toward the primary side space S1 (in a lateral direction in FIG. 3). In this embodiment, the opening portion 131 of the first housing 13 and the air filter element 10 have a rectangular shape slightly elongated in the air introducing direction as viewed in a plan view. The air filter element 10 holds the filter body 28 such that the folding edges 28a of the filter body 28 extend in a direction parallel to a short side direction of the air filter element 10. Accordingly, when the air filter element 10 is fitted in the opening portion 131, the folding edges 28a of the filter body 28 naturally extend in a direction orthogonal to the air introducing direction toward the primary side space S1.

The second housing 14 is a box-shaped housing having a rectangular shape as viewed in a plan view which opens downward, and is detachably assembled to an upper portion of the first housing 13 so as to cover the air filter element 10. With such a configuration, the secondary side space S2 is formed above the air filter element 10. In the same manner as the first housing 13, the whole second housing 14 is made of a resin material.

An outlet duct 20 for discharging air which passes through the air filter element 10 is mounted on a side wall (a left side wall in FIG. 3) of the second housing 14 on the same side as the first side wall 13a of the first housing 13 in an outwardly projecting manner. The outlet hose 8 is connected to the outlet duct 20. The outlet duct 20 is disposed just above the inlet duct 16 parallel to the inlet duct 16. With such a configuration, air which passes through the air filter element 10 is discharged along a horizontal direction from the secondary side space S2.

As shown in FIG. 3, an upstream side of the outlet duct 20 extends to the inside of the side wall of the second housing 14. A portion of the outlet duct 20 disposed inside the side wall of the second housing 14 is formed also as a ceiling wall of the second housing 14 (a ceiling wall of the cleaner case 12).

On a portion of the ceiling wall of the second housing 14 which is also used as the outlet duct 20, a sensor mounting portion 22 formed of a through hole which vertically extends through the ceiling wall is formed. The air flow sensor 6 is inserted into the sensor mounting portion 22 and is fixed to the second housing 14 in a state where the air flow sensor 6 faces the inside of the outlet duct 20.

The air flow sensor 6 is a plug-in-type hot wire type air flow sensor. That is, the air flow sensor 6 includes a heat wire (hot wire) such as a platinum heating wire, and is formed so as to output a voltage which corresponds to a temperature of the hot wire. A temperature of the hot wire changes correspondingly to a change in flow speed of air in the outlet duct 20, and hence, an ECU not shown in the drawing detects information (voltage) outputted from the air flow sensor 6 as an amount of intake air, and determines a fuel injection amount based on the amount of intake air.

(Operation and Advantageous Effect of Intake Device 1)

In the above-mentioned intake device 1, air sucked from the cool air duct 2 is introduced into the primary side space S1 of the air cleaner 4 through the inlet duct 16. As indicated by arrows shown in FIG. 5, air (intake air) introduced into the primary side space S1 impinges on the air filter element 10, while upwardly moving along the second side wall 13*b* (deflecting portion 18), and is reversed. Thereafter, the air passes through the air filter element 10 while flowing in an opposite direction (toward the first side wall 13*a*) along a lower surface of the air filter element 10 and enters the secondary side space S2. At this time, the folding edges 28*a* of the filter body 28 become an appropriate resistance against the flow of air, and hence, air passes through the air filter element 10 while uniformly expanding to the whole surface of the air filter element 10 and moves to the secondary side space S2. Accordingly, the occurrence of a phenomenon that the flow of air is deflected to a partial region in the secondary side space S2 or a vortex flow is formed in the secondary side space S2 is prevented. Accordingly, air is discharged from the outlet duct 20 while flowing in a stable manner and passes the position of the air flow sensor 6.

Therefore, according to the above-mentioned intake device 1, unlike the prior art, the flow of air at the position of the air flow sensor 6 can be stabilized without providing a flow straightening slit or a flow straightening plate to the cleaner case 12. In other words, detection accuracy by the air flow sensor 6 can be stably maintained without causing a drawback brought about by providing a flow straightening slit or a flow straightening plate to the cleaner case 12, that is, lowering of an output/torque of an engine or lowering of a yield at the time of manufacturing the intake device.

Further, by making air uniformly pass through the air filter element 10 as described above, smear on the filter body 28 can be made uniform over the whole filter. Accordingly, a lifetime of the air filter element 10 can be advantageously prolonged.

According to the above-mentioned intake device 1, the inlet duct 16 extends to the inside of the first housing 13 (primary side space S1). That is, the inlet duct 16 has the extension portion 16*a*. Accordingly, as shown in FIG. 2, regardless of the configuration where the cool air duct 2 extends adjacently to the first side wall 13*a* along the first side wall 13*a* and thereafter is bent approximately at a right angle and an end portion of the cool air duct 2 is connected to the opening portion formed on the first side wall 13*a*, a length of an air passage extending in a direction opposite to the second side wall 13*b* can be ensured. Thus, the intake device 1 also has the advantageous effect that, while air is introduced into the primary side space S1 along a flow passage which is bent approximately at a right angle (even when a flow component in a direction along the first side wall 13*a* exists in the flow of air at a position of the opening portion of the first side wall 13*a*), the flow of air introduced from the opening portion formed on the first side wall 13*a* can be reliably directed to the second side wall 13*b* on which the deflecting portion 18 is formed.

Further, in the above-mentioned intake device 1, as shown in FIG. 1 to FIG. 3, an air-intake portion of the cool air duct 2 is positioned above the inlet duct 16. However, the inlet duct 16 has the extension portion 16*a* and hence, in the same manner as described above, the flow of air can be reliably directed to the second side wall 13*b* on which the deflecting portion 18 is formed. That is, while air is introduced into the primary side space along a passage which is bent in the vertical direction (even when a flow component toward the bottom wall 13*e* of the cleaner case 12 exists in the flow of air at the position of the opening portion of the first side wall 13*a*), the flow of air can be reliably directed to the second side wall 13*b* on which the deflecting portion 18 is formed.

Further, according to the above-mentioned intake device 1, the outlet duct 20 extends to the inside of the second housing 14 (secondary side space S2) and hence, a length of an intake passage leading to the air cleaner 4 from the respective cylinders of the engine is substantially extended. Accordingly, a function of muffling an intake sound is advantageously exhibited.

(Modifications)

The above-mentioned intake device 1 is an example of a preferred embodiment of the intake device 1 of the engine according to the present invention, and the specific configuration of the intake device 1 can be appropriately modified without departing from the gist of the present invention.

Figure 5:
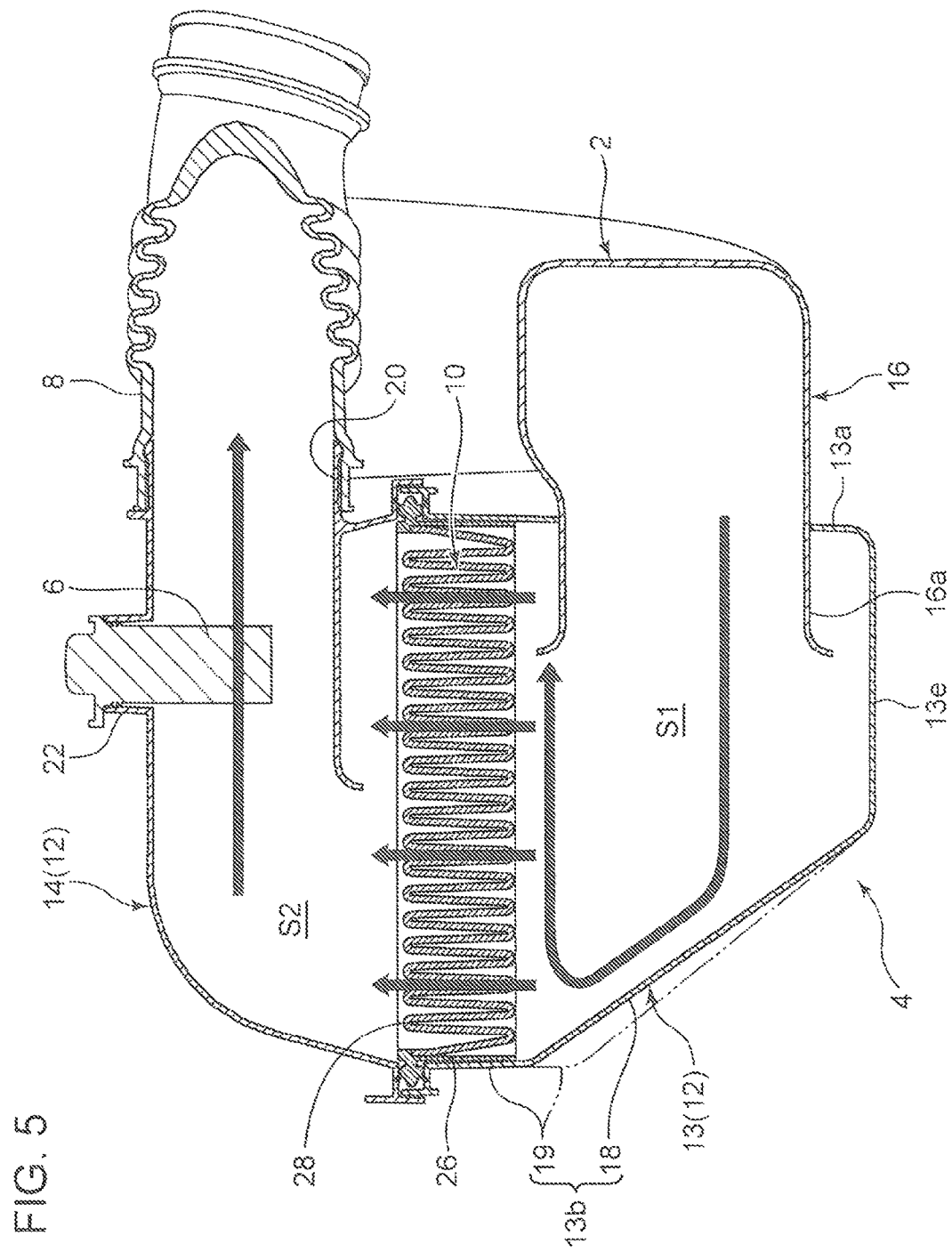
FIG. 5 is a cross-sectional view of the intake device showing a flow of air (intake air) in an air cleaner (a cross-sectional view corresponding to FIG. 3).

In the above-mentioned embodiment, as indicated by a solid line in FIG. 5, the vertical wall portion 19 of the second side wall 13*b* is positioned above the opening portion (outlet-side opening) of the inlet duct 16. However, for example, as indicated by a double-dashed chain line in FIG. 5, the vertical wall portion 19 may be configured to extend to a further lower side with respect to the air filter element 10 such that an upper end portion of the opening portion of the inlet duct 16 and the vertical wall portion 19 oppositely face each other. With such a configuration, air introduced from the inlet duct 16 flows upward along the deflecting portion 18 and, then, impinges on the air filter element 10 along the vertical wall portion 19. Therefore, the flow of air is easily reversed into the flow of air along a lower surface of the air filter element 10. Accordingly, such a modification is more effective in suppressing the occurrence of a phenomenon that the flow of air is deflected to a fixed region in the secondary side space S2 or a vortex flow is formed in the secondary side space S2.

Figure 6:
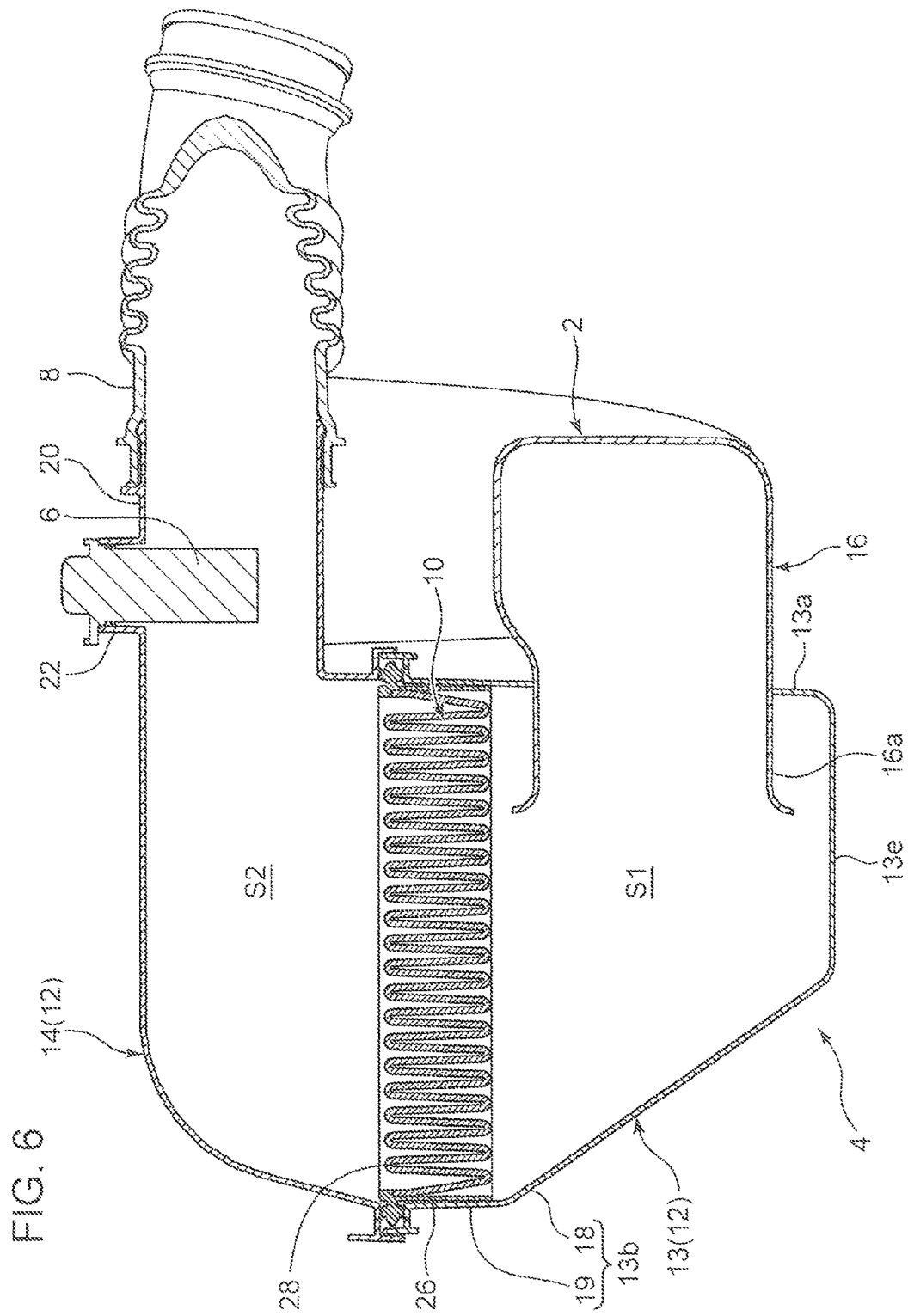
FIG. 6 is a cross-sectional view of an intake device according to a modification.

Further, in the above-mentioned embodiment, the upstream side of the outlet duct 20 extends to the inside of the secondary side space S2, and in the outlet duct 20, the air flow sensor 6 is disposed on this extension portion of the outlet duct 20 (the position inside the side wall of the second housing 14). However, as shown in FIG. 6, in the case where the outlet duct 20 is disposed only outside the side wall of the second housing 14, the air flow sensor 6 may be disposed on the outlet duct 20. With such a configuration, an upper side of the air filter element 10 is widely opened and hence, the flow of air in the secondary side space S2 is further minimally deflected. Accordingly, it is possible to expect that air is discharged from the outlet duct 20 while forming a more stable flow.

In this manner, the air flow sensor 6 is mounted on the outlet duct 20 of the cleaner case 12. However, besides such a case, the air flow sensor 6 may be mounted on a portion of the outlet hose 8 at a position as close as possible to the position where the outlet duct 20 is connected, for example.

Figure 7:
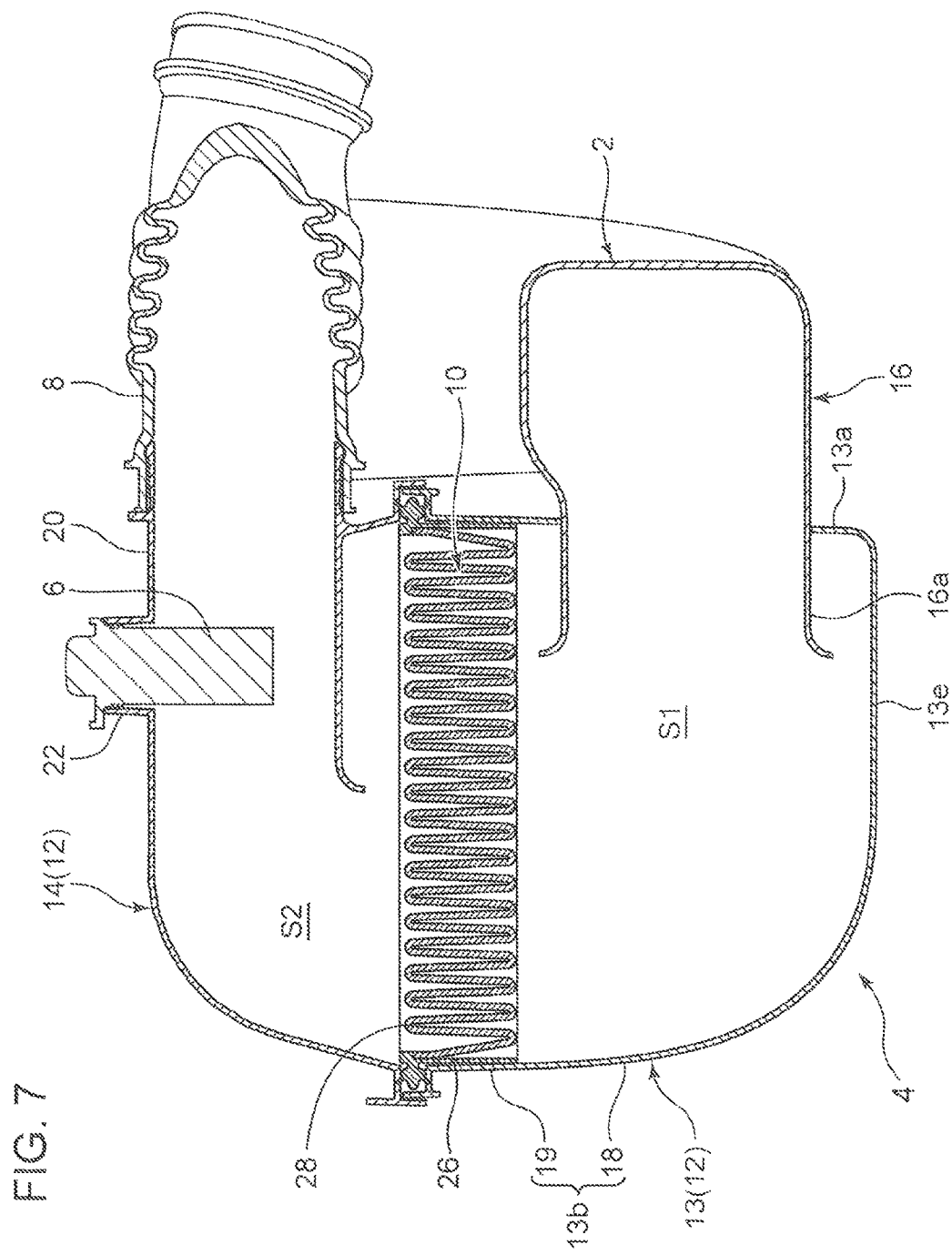
FIG. 7 is a cross-sectional view of an intake device according to another modification

In the above-mentioned embodiment, the deflecting portion 18 of the cleaner case 12 is formed of the inclined surface as shown in FIG. 3, that is, a flat inclined surface. However, besides such a case, the deflecting portion 18 may be formed of a surface curved in a circular arc shape as shown in FIG. 7. In short, the deflecting portion 18 may have any shape provided such that the flow of air introduced from the inlet duct 16 in a horizontal direction can be reversed along the lower surface of the air filter element 10 while smoothly deflecting the flow of air into the upward flow.

The present invention described heretofore is summarized as follows.

To overcome the above-mentioned drawback, according to the present invention, there is provided an intake device of an engine including: an air cleaner that includes an air filter disposed approximately horizontally, a cleaner case forming a primary side space below the air filter and forming a secondary side space above the air filter, and an inlet duct for introducing air into the primary side space from a side and an outlet duct for discharging air to a side from the secondary side space, the inlet duct and the outlet duct being provided on the cleaner case; and an air flow sensor fixed to the outlet duct or an outlet hose connected to the outlet duct, wherein the cleaner case includes a first side wall on which the inlet duct is provided and a second side wall which opposedly faces the first side wall, the air filter has a folded shape like bellows, and is held in the cleaner case such that folding edges of the air filter extend in a direction orthogonal to an arranging direction of the first side wall and the second side wall, and the second side wall has a deflecting portion which deflects air introduced from the inlet duct into a flow directed in an obliquely upward direction.

With the configuration of such an intake device, air (intake air) introduced into the primary side space from the inlet duct moves upward along the deflecting portion of the second side wall, and flows in the opposite direction (first side wall side) along the lower surface of the air filter. Then, the folding edges of the air filter become an appropriate resistance of the flow of air and hence, air passes through the air filter while uniformly expanding to the whole surface of the air filter and enters the secondary side space. Accordingly, the occurrence of a phenomenon that the flow of air is deflected to a fixed region in the secondary side space or a vortex flow is formed in the secondary side space is prevented. Accordingly, air is discharged from the outlet duct while forming the stable flow and passes the air flow sensor. Therefore, the flow of air at the position of the air flow sensor can be stabilized without providing a flow straightening slit or flow straightening plate to the cleaner case. As a result, detection accuracy by the air flow sensor can be stably maintained without causing a drawback such as lowering of an output/torque of the engine or lowering of a yield at the time of manufacturing the intake device.

In the above-mentioned intake device, it is preferable that the deflecting portion be formed of an inclined surface inclined upwardly as extending from the first side wall toward the second side wall.

With such a configuration, air introduced into the primary side space from the inlet duct can be deflected in an obliquely upward direction with the simple configuration. Accordingly, it is possible to acquire the above-mentioned manner of operation and advantageous effects while maintaining excellent productivity of the cleaner case, eventually, excellent productivity of the air cleaner.

In this case, it is preferable that the second side wall have a vertical wall portion continuously formed on an upper side of the deflecting portion and extending approximately vertically, and an upper end portion of an exit-side opening of the inlet duct opposedly face the vertical wall portion.

With such a configuration, the flow of air introduced from the inlet duct is directed upward along the deflecting portion and, further, impinges on the air filter along the vertical wall portion. Thus, the flow of air is easily reversed to the flow of air along the lower surface of the air filter. Accordingly, such a modification is effective in suppressing the occurrence of a phenomenon that the flow of air is deflected to a fixed region in the secondary side space or a vortex flow is formed in the secondary side space.

It is preferable that the outlet duct be disposed just above the inlet duct.

With such a configuration, the inlet duct and the outlet duct are disposed on the same side surface of the cleaner case and hence, the air cleaner can be formed in a compact manner.

The above-mentioned intake device may further include a cool air duct through which air is taken in from an outside, wherein the cool air duct may be disposed adjacently to the first side wall to extend along the first side wall, be bent approximately at a right angle, and be connected to the inlet duct, and the inlet duct may be connected to the cleaner case in a state where the inlet duct is inserted into an opening portion formed in the first side wall, and has an extension portion projecting into an inside of the cleaner case and extending approximately horizontally toward the second side wall.

With such a configuration, a length of an air passage extending toward the second side wall can be ensured by the above-mentioned extension portion. Accordingly, while air is introduced into the primary side space along a passage which is bent approximately at a right angle (that is, even when a flow component in a direction along the first side wall exists in the flow of air at the position of the opening portion of the first side wall), the flow of air can be more reliably directed to the second side wall on which the deflecting portion is formed.

Further, the above-mentioned intake device may further include a cool air duct that is connected to the inlet duct and has an air take-in portion that takes in air at a position above the inlet duct, wherein the inlet duct may be connected to the cleaner case in the state where the inlet duct is inserted into the opening portion formed in the first side wall, and may have the extension portion projecting into the inside of the cleaner case and extending approximately horizontally toward the second side wall.

With such a configuration, a length of an air passage extending toward the second side wall can be ensured by the above-mentioned extension portion. Accordingly, while air is introduced into the primary side space along a passage which is bent in the vertical direction (that is, even when a flow component toward the bottom wall side of the cleaner case exists in the flow of air at the position of the opening portion of the first side wall), the flow of air can be more reliably directed to the second side wall on which the deflecting portion is formed.

The invention claimed is:

1. An intake device of an engine comprising:
   an air cleaner that includes an air filter disposed approximately horizontally, a cleaner case forming a primary side space below the air filter and forming a secondary side space above the air filter, and an inlet duct for introducing air into the primary side space from a side and an outlet duct for discharging air to a side from the secondary side space, the inlet duct and the outlet duct being provided on the cleaner case; and
   an air flow sensor fixed to the outlet duct or an outlet hose connected to the outlet duct, wherein
   the cleaner case includes a first side wall on which the inlet duct is provided and a second side wall which opposedly faces the first side wall,
   the air filter has a folded shape like bellows, and is held in the cleaner case such that folding edges of the air filter extend in a direction orthogonal to an arranging direction of the first side wall and the second side wall, and
   the second side wall has a deflecting portion which deflects air introduced from the inlet duct into a flow directed in an obliquely upward direction, and the deflecting portion is formed of an inclined surface inclined upwardly as being separated from the first side wall and having a top end positioned above an upper end portion of an exit-side opening of the inlet duct.

2. The intake device of an engine according to claim 1, wherein the second side wall has a vertical wall portion continuously formed on an upper side of the deflecting portion and extending approximately vertically.

3. The intake device of an engine according to claim 1, wherein the outlet duct is disposed just above the inlet duct.

4. The intake device of an engine according to claim 1, further comprising a cool air duct through which air is taken in from an outside, wherein
the cool air duct is disposed adjacently to the first side wall to extend along the first side wall, is bent approximately at a right angle, and is connected to the inlet duct, and
the inlet duct is connected to the cleaner case in a state where the inlet duct is inserted into an opening portion formed in the first side wall, and has an extension portion projecting into an inside of the cleaner case and extending approximately horizontally toward the second side wall.

5. The intake device of an engine according to claim 1, further comprising a cool air duct that is connected to the inlet duct and has an air take-in portion that takes in air at a position above the inlet duct, wherein
the inlet duct is connected to the cleaner case in the state where the inlet duct is inserted into an opening portion formed in the first side wall, and has an extension portion projecting into an inside of the cleaner case and extending approximately horizontally toward the second side wall.

* * * * *